United States Patent

[11] 3,614,719

| [72] | Inventor | Edmond B. Treacy<br>Vernon, Conn. |
|---|---|---|
| [21] | Appl. No. | 778,519 |
| [22] | Filed | Nov. 25, 1968 |
| [45] | Patented | Oct. 19, 1971 |
| [73] | Assignee | United Aircraft Corporation<br>East Hartford, Conn. |

[54] ADAPTIVE PULSE ECHO TARGET IDENTIFICATION SYSTEM
7 Claims, 3 Drawing Figs.

[52] U.S. Cl. .................................................... 340/3 R,
340/3 E, 340/3 FM, 343/7.5, 343/17.2 R
[51] Int. Cl. .................................................... G01s 9/66
[50] Field of Search .......................................... 340/3, 3
FM, 3 E; 343/7.5, 17.1, 17.2, 17.5

[56] References Cited
UNITED STATES PATENTS

| 2,890,437 | 6/1959 | Dudley et al.......... | 340/3 |
| 3,122,720 | 2/1964 | Morse ................ | 340/3 |

*Primary Examiner*—Richard A. Farley
*Attorney*—Donald F. Bradley

ABSTRACT: An adaptive target identification system is described in which a chirped or frequency swept pulse is transmitted towards a target. The reflected pulse is analyzed over its frequency spectrum by a series of tuned filters to produce a reflection spectrum which is proportional to the reflection coefficient of the target as a function of frequency. The next chirped pulse to be transmitted is modulated in response to the reflection spectrum, each pulse echo controlling the next transmitted pulse. A steady state condition results in which successive transmitted pulses are identical and uniquely determined by the reflection spectrum of the target.

INVENTOR
EDMOND B. TREACY

BY Donald F. Bradley
ATTORNEY 3,614,719

ADAPTIVE PULSE ECHO TARGET IDENTIFICATION SYSTEM

BACKGROUND OF THE INVENTION

This invention relates to a pulse echo target identification system that can distinguish between targets having different characteristics. The system is adaptive in nature in that the determining characteristics of the target are not known in advance, but are learned by the system as it interacts with the target.

The system operates sensing to a radar or sonar system in that a pulse is transmitted toward the target, and the pulse echo is received by a receiver. The unique feature in the present system is the use of a signal processing unit which leads the echo pulse and controls a property of the next transmitted pulse as a function of the characteristics of the received echo pulse, which are in turn a function of the characteristics of the target.

The characteristic of the target which is used for identification is preferably its reflectivity, which may depend on its shape and absorption characteristics. Further, it is not just a single variable such as power or frequency of the transmitter pulse which is varied upon its reflection by the target, but a function of frequency which may be defined at hundreds of points. The specific function is usually not known in advance, but is learned during system operation. The adaptation result or function is unique to the target spectrum, and changes if the spectral characteristics of the target change.

The transmitted pulse, which may either be electromagnetic or acoustic, is chirped to produce a constant frequency sweep characteristic. A chirped pulse is one in which the frequency is varied over the width of the pulse. Chirped pulses are well known in the radar and animal sonar fields.

The target will have a reflection spectrum which will reflect different frequencies with different intensities, and cause an echo having different spectral power and phase distribution from the transmitted incident pulse. The frequency range of the transmitted pulse is chosen to contain a band of frequencies sufficient to cover part of the spectrum where the majority of types of targets have reflection spectra that differ sufficiently from one another to permit identification.

The heart of the system is a signal processing unit which reads the echo pulse and controls the transmission of the next pulse. Specifically, the echo received from the target has a spectrum which has been modified by the target. The signal processing unit, through a series of frequency tuned filters or other devices capable of measuring the spectral amplitude at a single frequency or small range of frequencies, produces a waveform which at each point is proportional to the spectral amplitude of the echo at each frequency or band of frequencies over the range of the chirped transmitted pulse. This waveform modulates the next transmitter pulse.

The signal processing of each echo pulse and the amplitude modulation of each chirped transmitted pulse continues until a steady state condition is attained wherein successive transmitted pulses become identical or nearly identical, and will not change unless the target characteristics change.

The output of the system may take any convenient form and would be connected to the output of the signal processing unit. For example, an audio output may be utilized when the adapted spectra from different targets produce distinguishable sounds. Visual display or storage of the adapted spectral output are also contemplated, the latter being particularly useful when it is desired to compare the adapted spectrum from an unknown target with those known targets for purposes of identification.

The uses of the target identification system of this invention are myriad and are limited only by the imagination of the designer. Obvious applications are in radar, sonar for submarine detection for fishing, devices to aid the blind, ultrasonic diagnosis in materials study, and in medicine, geology and chemistry.

Two distinct modes of operation of the system are possible. In the first mode, the system adapts to an unknown target, and the operator or a computer either identifies the target by reference to past operations or learns to identify it in the future. In the second mode an operator who has become aware of a target by other means, attempts to establish whether or not the target is one that he is looking for; and the first transmitted pulse is of the form that has been previously adapted to the wanted target, comparison with the known adapted spectrum of the desired target being made.

SUMMARY OF THE INVENTION

It is therefore an object of this invention to provide a target identification system which can distinguish between targets having different reflection spectrum characteristics.

Another object of this invention is a pulse echo target identification system in which the transmitted pulse adapts to the target spectrum.

A further object of this invention is a target identification system in which a frequency swept pulse is transmitted to the target, the pulse echo being used to vary the next pulse as a function of the reflection spectrum of the target over the frequency range of the transmitted pulse.

In accordance with the present invention, a transmitter sends out pulses that are constrained to have a constant length and identical frequency sweep characteristics from pulse to pulse. Each pulse also is amplitude modulated as a function of the previous echoes received from a target. As each echo from the target is received, it is fed into a signal processing unit such as a spectrum analyzer capable of reading the spectral amplitude of a single pulse, and an amplitude modulated signal is derived from the spectral analyzer. This signal will amplitude modulate the next transmitted pulse. After a number of iteration, the pulse will adapt to the target and converge to a steady state unique to the target.

The foregoing and other objects, features and advantages of the present invention will become more apparent in the light of the following detailed description of one embodiment thereof as illustrated in the accompanying drawings.

DESCRIPTION OF THE PREFERRED EMBODIMENT

Figure 1:
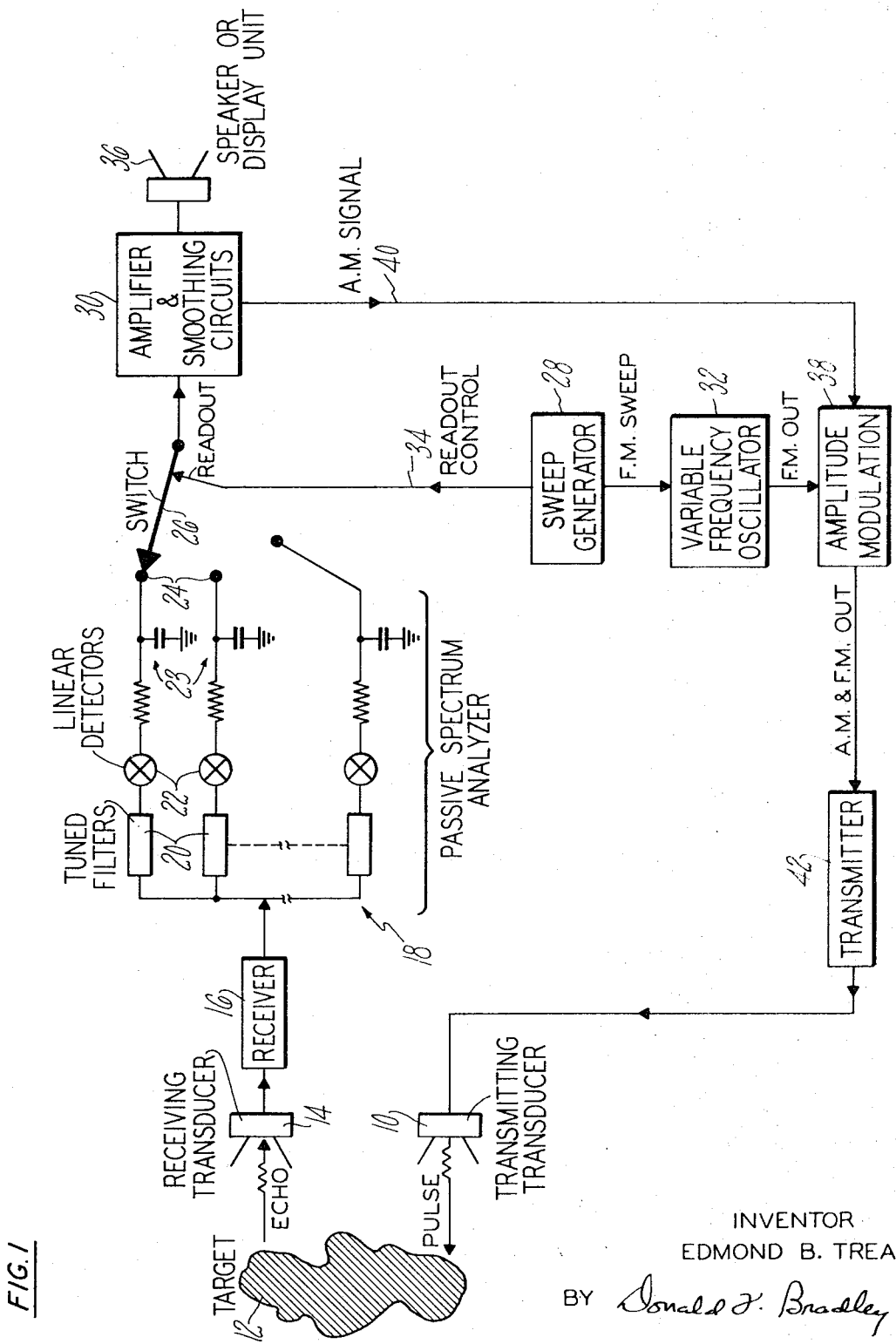
FIG. 1 shows in block diagram schematic form the adaptive pulse echo target identification system of this invention.

Referring to FIG. 1, a transmitting transducer 10 produces a chirped pulse, that is, a pulse whose frequency is swept over some predetermined range. The pulse may be either acoustic or electromagnetic, the latter including both microwave and light waves, depending on the particular function of the system. Applying a chirp to any of the above signal sources is well known in the art and need not be described in detail. For purposes of illustration, a pulse varying from 500 c.p.s. to 3,550 c.p.s. in 70 milliseconds has been selected. The frequency sweep is chosen to be exponential rather than linear, the reason being that effects due to motion of the target (Doppler effect) would be easier to correct in such a system.

The pulse is directed toward a target 12 from which the pulse scatters and is picked up by a receiving transducer 14 and fed to the receiver 16. Amplification may be required prior to or after the receiver depending upon the strength of the received pulse.

The echo pulse output from the receiver 16 is fed into a passive spectrum analyzer 18 which consists of a set of N-tuned filters 20, each of which feed into a linear detector 22.

With the frequencies and times chosen above for ease of computation, the pulse will contain 120 cycles; and by assuming an increasing constant rate of change of phase for each cycle, the pulse is equivalent to replacing a smooth exponential phase curve by a sequence of straight line segments.

Corresponding to the 120 cycles, the frequency functions are defined at 120 points; that is, there are in this example 120 frequencies at which the spectral amplitude of the target is measured and correspondingly 120 filters 20 ($N=120$). The frequencies of the filters match the reciprocals of the periods of the various individual cycles of the waveform.

It should be emphasized that the above illustration using 120 cycles and 120 filters is merely a simplified example for computational purposes and that the number of filters need not be as large as the number of filters in the waveform. The frequency range will depend primarily on the type of target, and the number of filters will depend on the amount of information as to the target spectrum desired. The important point is that sufficient filters of different frequency are used to produce a spectral amplitude profile within the frequency range of the transmitted pulse to thereby provide information of the target sufficient for the desired purpose. This could mean 20 or 2,000 filters, with correspondingly varied frequency responses.

The output from each linear detector 22 is integrated by an integrating circuit 23 consisting for example of a series resistor and parallel capacitor, and the integrated signal is fed to an output terminal 24 in each path. Integration is desirable to smooth the output from the detectors.

Other spectrum analyzers could be used, such as a high-speed sampling system plus analog-to-digital conversion and fast Fourier transform digital analysis. Other devices will be apparent to those skilled in the art.

The readout of the spectrum analyzer 18 is an amplitude modulated waveform having a length equal to that of the transmitted pulse, and an amplitude related to the spectral amplitude of the previously received pulse and the target. The spectral amplitude at any sampled frequency determined the amplitude of the next transmitter pulse at the time when the rate of change of phase of the transmitter pulse matches the frequency under consideration.

To that end the spectral readout is shown as a multiposition switch 26 that sweeps across the output terminals 24 of the spectrum analyzer in synchronism with the frequency sweep of the transmitter pulse. The sweep generator 28 controls both the frequency sweep through oscillator 32 and the readout switch through line 34. Other means for obtaining the spectral readout may also be used, and may be preferred, such as well-known sampling systems.

The amplitude modulation function is derived from the spectral readout by smoothing the readout and passing it through an amplifier. To accomplish this, the switch 26 feeds the signal from each output terminal in sequence to an amplifier 30 where the necessary amplification and smoothing of the spectral readout is accomplished. For certain applications the sweep could be linear, hyperbolic or some other function.

Amplifier 30 is preferably logarithmic in its gain characteristics, and preferably also includes a linearity control which would be a single potentiometer. For example, if the reflection spectrum shows large deviations from a flat response the amplifier would be set highly nonlinear, in which condition the system adapts rapidly and does not amplify the variations strongly. If the reflection of the target is relatively flat with only minor variations, a more linear condition that adapts more slowly but amplifies the variations more strongly is preferred.

The amplitude modulation signal which appears at amplifier 30 from detector 22 is the final display of the system. As the modulation signal is being generated, it may be fed directly to a speaker 36 if it is in the audio region, or an audio signal may be generated directly from the readout of the detectors 22, with or without further signal processing such as pulse compression. Rather than an audio output, the readout may be fed to a computer or display unit, or stored for future use, depending on the desired application.

The amplitude modulation signal is also used to modulate the next transmitted pulse. The chirped transmitted pulse is generated by variable frequency oscillator 32 which is swept through the desired frequency range by sweep generator 28. The FM output is fed to amplitude modulator 38 where it is amplitude modulated by the signal from amplifier 30 fed through line 40. The amplitude modulated FM signal is then fed to transmitter 42 where the next transmitted pulse generated via transducer 10.

The next transmitted pulse will thus have an amplitude modulation imposed thereon which is a function of the reflection spectrum of the target. After a number of pulses, the amplitude modulation signal will achieve a steady state which uniquely represents the target; that is, the target will be identified by its unique reflection spectrum as represented by the amplitude modulation signal.

Figure 2:
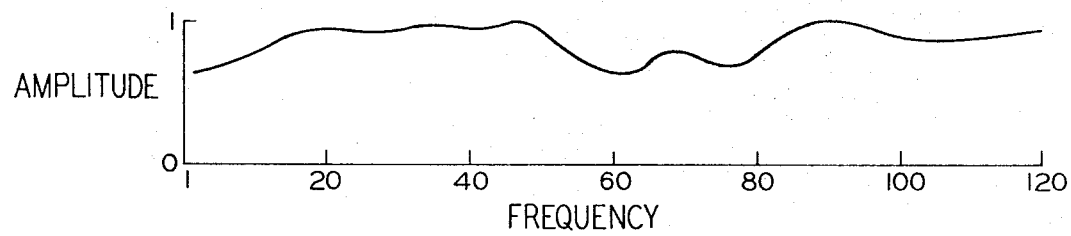
FIGS. 2 and 3 show the reflection coefficient curve and selected pulse echoes of a randomly selected target.
Figure 3:
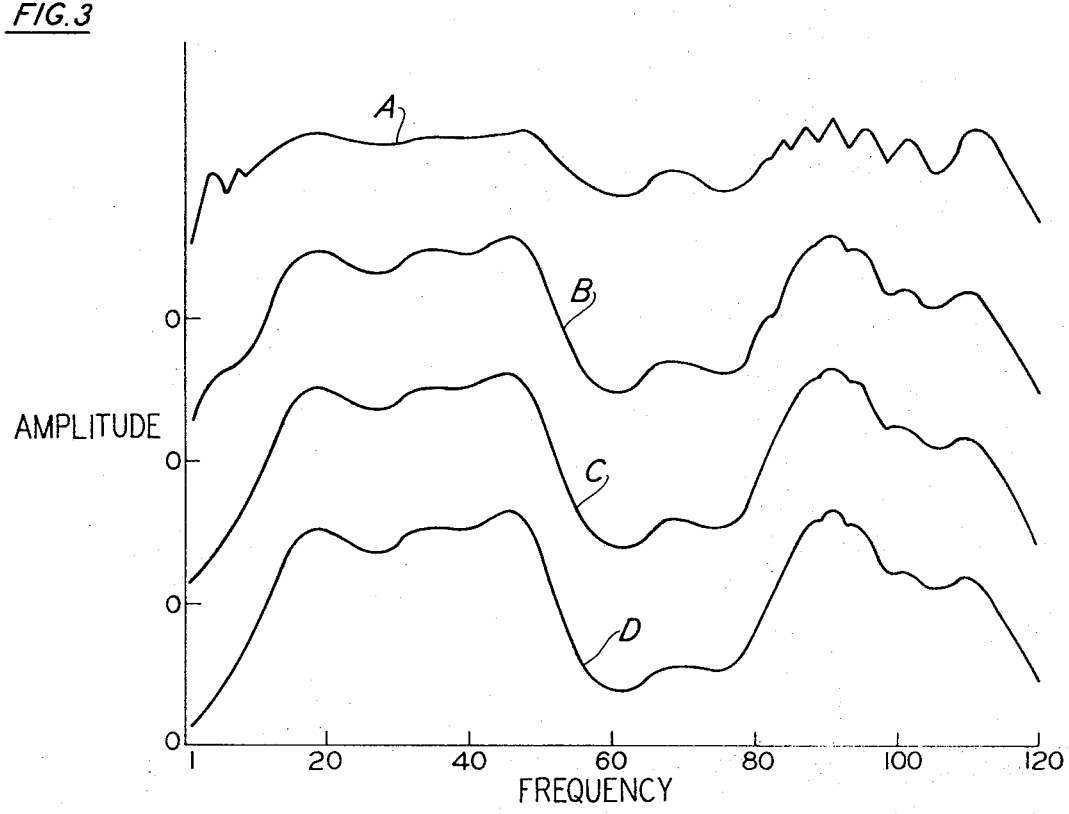

FIG. 2 shows the reflection coefficient curve of a randomly selected target, the amplitude of the reflection spectrum being plotted versus frequency. FIG. 3 shows the amplitude modulations signal (detector pulses) plotted versus frequency after selected pulses, the plot illustrating how the amplitude modulation signal approaches the spectrum of the target. Plot A shows the amplitude modulation signal after one pulse has been transmitted, plot B after 5 pulses, plot C after 15 pulses and plot D after 30 pulses. A logarithmic amplifier 30 has been used in this example. Note that the variations in the reflection coefficient curve are enhanced. Note also that curve D is essentially the same as B, proving that the system has adapted to the target in five interactions with it.

Other elements known to this skilled in the art may be added to the system of FIG. 1 such as amplifiers, automatic gain control, filters, noise limiters, etc.

Although the invention has been shown and described with respect to one embodiment thereof, it should be understood by those skilled in the art that changes and omissions may be made without departing from the scope of the invention.

I claim:
1. A target identification system comprising:
   means for generating a plurality of frequency varying pulses,
   means for transmitting a first of said pulses toward a target, at least a portion of said first pulse being reflected by said target upon intersection herewith,
   receiver means for sensing said reflected pulse and producing a first signal in response thereto,
   spectrum analyzer means for producing from said first signal a second signal proportional in amplitude to the reflection coefficient of the target as a function of the frequency range of said transmitted pulse,
   means for transmitting a second of said frequency varying pulses toward said target,
   means for modulating said second signal upon said second frequency varying pulse,
   and means for producing an output from said second signal.
2. A target identification system as in claim 1 in which said output comprises an audio output signal.
3. A target identification system as in claim 1 in which said spectrum analyzer means includes a plurality of filters, each filter being tuned to a different frequency within the frequency range of said frequency varying pulses,
   detector means connected with each said filter, each said filter passing a selected portion of the said first signal to its corresponding detector whereby each said filter-detector combination produces a spectral signal proportional to the amplitude of the reflected pulse at the frequency of the filter,
   and means for scanning the spectral signal from each said detector to produce said second signal.
4. A target identification system as in claim i and including amplifier means connected between said spectrum analyzer means and said modulating means,
   and means for varying the linearity of said amplifier means.
5. A target identification system as in claim 1 in which said generating means exponentially varies the frequency of said pulses.

6. A target identification system as in claim 1 in which said second signal is amplitude modulated upon such second frequency varying pulse.

7. A target identification system comprising:
means for generating a plurality of frequency varying pulses,
means for transmitting said pulses in timed relation toward a target,
receiver means for sensing the reflection of each said pulse from said target,
spectrum analyzer means connected with said receiver means for producing from each reflected pulse an output signal proportional in amplitude to the reflection coefficient of the target over the frequency range of said transmitted pulses,
and means for amplitude modulating said output signal upon the next transmitted pulse.

PO-1050
(5/69)

UNITED STATES PATENT OFFICE
CERTIFICATE OF CORRECTION

Patent No. 3,614,719          Dated  October 19, 1971

Inventor(s)   Edmond B. Treacy

It is certified that error appears in the above-identified patent and that said Letters Patent are hereby corrected as shown below:

Claim 1, Col. 4, line 42, "herewith" should be -- therewith --

Claim 4, Col. 4, line 69, "claim i" should be -- claim 1 --

Claim 6, Col. 5, line 2, "such" should be -- said --

Signed and sealed this 28th day of March 1972.

(SEAL)
Attest:

EDWARD M. FLETCHER, JR.
Attesting Officer

ROBERT GOTTSCHALK
Commissioner of Patents